United States Patent [19]

Schneider

[11] Patent Number: 4,624,678
[45] Date of Patent: Nov. 25, 1986

[54] PROCESS FOR THE PREPARATION OF GRANULAR DYE FORMULATIONS

[75] Inventor: Dieter Schneider, Grenzach-Wyhlen, Fed. Rep. of Germany

[73] Assignee: Ciba-Geigy Corporation, Ardsley, N.Y.

[21] Appl. No.: 728,356

[22] Filed: Apr. 29, 1985

[30] Foreign Application Priority Data

May 4, 1984 [CH] Switzerland ............ 2188/84

[51] Int. Cl.$^4$ ............................................ C09B 67/02
[52] U.S. Cl. ............................................ 8/526; 8/524; 8/609; 8/611; 8/654; 8/657
[58] Field of Search ............... 8/524, 609, 611, 524, 8/526, 609

[56] References Cited

U.S. PATENT DOCUMENTS 4,286,959  9/1981  Horn et al. ............... 8/524
4,295,851 10/1981  Neumann et al. ......... 8/524

FOREIGN PATENT DOCUMENTS 1590154  5/1981  United Kingdom .

*Primary Examiner*—A. Lionel Clingman
*Attorney, Agent, or Firm*—Edward McC. Roberts; Meredith C. Findlay

[57] ABSTRACT

The invention describes a process for the preparation of granular dye formulations by mixing a (preferably water-soluble) dye, water, and optionally further assistants with a polyethylene glycol that melts in the range from 40° to 150° C., and drying the resultant solution or suspension in a spray drier or fluidized bed drier. The granular formulations so obtained are permanently dust-free, dissolve rapidly in an aqueous dyebath, and do not cause foaming during dyeing.

9 Claims, No Drawings

PROCESS FOR THE PREPARATION OF GRANULAR DYE FORMULATIONS

The present invention relates to a process for the preparation of granular dye formulations, to the formulations obtained by said process, and to the use thereof for the preparation of dye baths, padding liquors or printing pastes for dyeing or printing textile material.

Compared with commercially available powder formulations, granular formulations have a number of advantages. For example, they are virtually non-dusting, they have a high bulk density, they do not form lumps during storage, and they are still free-flowing after years. Because of these advantages, granulating methods have meanwhile also found wide application in the art of dye formulation. Examples of important granulating methods are spray and build-up granulation or also melt granulation, as well as fluidised bed granulation.

With the development of efficient spray driers and fluidised bed driers, conventional drying methods have been increasingly superseded in recent years by spray granulating and fluidised bed granulating methods. The essential advantages of these drying methods are in particular the continuous mode of operation as well as the high product output. In addition, a granular formulation with relatively tight particle distribution is obtained and the granular size can be easily controlled. However, the drawback of these methods is that often an insufficiently abrasion-proof and somewhat porous granular formulation is obtained, so that during transportation further abrasion occurs, which proves exceedingly troublesome when employing such products in the dye-house.

To counteract such abrasion and to prevent dust formation as far as possible, the proposal has been made for example in DE-OS No. 2 656 408 to add a binding agent and a dust inhibitor to the spray slurry, which last mentioned assistant may also be sprayed onto the already dried product. It is recommended in this publication to use surfactants as dust inhibitors, the consequence of which is that the dyebaths obtained from the resultant dye formulations have a tendency to foam. The use of mineral oil based dust inhibitors has also not led to the desired success, as often no permanent dust inhibition is achieved.

It is therefore the object of the present invention to provide a process in which permanently dust-free granular dye formulations are obtained by spray drying or fluidised bed drying, which formulations dissolved rapidly, or are readily dispersible, in the dye liquor and cause no foaming during dyeing.

This object is achieved by adding to the aqueous dye slurry, which may contain further assistants conventionally employed in dye formulations, a polyethylene glycol having a melting point in the range from 40° to 150° C. Such polyethylene glycols are liquified in the hot stream of air in the drier and effect bonding of the dye particles during the drying operation, i.e. a solution or suspension of the dye forms in the melt of the polyethylene glycol, depending on the ratio of dye to polyethylene glycol. The polyethylene glycol thus acts as binder or polymeric matrix and so makes it possible to prepare permanently dust-free flowable granular formulations.

Accordingly, the present invention relates to a process for the preparation of granular dye formulations by suspending and/or dissolving a dye and, optionally, further assistants in water and drying the resultant solution or suspension in a spray drier or fluidised bed drier, which process comprises adding to said solution or suspension, before drying, a polyethylene glycol that melts in the range from 40° to 150° C.

It is preferred to use a polyethylene glycol having a molecular weight in the range from 1000 to 40,000, most preferably from 1500 to 20,000. Such polyethylene glycols melt in the range from 40° to 60° C. It will be clearly understood that, when using temperature-sensitive dyes, the melting point of the polyethylene glycol employed must be below the decomposition temperature of the dye to be granulated.

It is an essential feature of the present invention that stable granular formulations are obtained with relatively little polyethylene glycol. In particular, when using low melting cationic dyes, less than 20% by weight of polyethylene glycol suffices in some cases, based on the dye. However, it is advantageous to use sufficient polyethylene glycol to obtain a melt when the dye solution or suspension containing the polyethylene glycol is introduced into the spray or fluidised bed drier. In particular, 0.5 to 2 parts of polyethylene glycol are used per 1 part of dye.

Suitable dyes, by which are also meant fluorescent whitening agents, are in particular water-soluble dyes, for example acid dyes such as nitro, aminoketone, ketone-imine, methine, nitrodiphenylamine, quinoline, aminonaphthoquinone or coumarin dyes, and, most particularly, anthraquinone dyes and azo dyes such as monoazo and disazo dyes.

These dyes contain one or more anionic water-solubilising groups, for example a carboxylic acid group or, in particular, a sulfonic acid group, and are usually in the form of a salt, for example the lithium, sodium, potassium or ammonium salt.

The process of this invention is particularly suitable for granulating water-soluble cationic dyes and fluorescent whitening agents which may belong to a very wide range of chemical classes.

The dyes in question are salts such as chlorides, sulfates, methosulfates or onium chlorides or metal halides, for example tetrachlorozincate salts of azo dyes such as monoazo, disazo and polyazo dyes; and anthraquinone dyes, phthalocyanine dyes, diarylmethane and triarylmethane dyes; methine, polymethine and azomethine dyes; thiazole dyes, ketone-imine, acridine, cyanine, nitro, quinoline, benzimidazole, xanthene, azine, oxazine, thiazine and triazene dyes which carry at least one quaternary nitrogen atom in the molecule.

In addition to water-soluble dyes, it is also possible to granulate water-insoluble or sparingly water-soluble dyes. Such dyes are, for example, sulfur dyes or pigment dyes, but are preferably disperse dyes and, most preferably, vat dyes, which belong chemically to a very wide range of classes.

The disperse dyes are e.g. nitro, aminoketone, ketone-imine, methine, polymethine, diphenylamine, quinoline, benzimidazole, xanthene, oxazine, aminonaphthoquinone or coumarin dyes which do not contain carboxylic acid and/or sulfonic acid groups, and are in particular anthraquinone and azo dyes such as mono- or disazo dyes. The vat dyes are dyes which are applied in solid dispersed form to the fabric and, after development, are again present in water-insoluble form.

In addition to granulating individual dyes, it is, of course, also possible in the process of this invention to granulate mixtures of dyes. Such mixtures may suitably be combinations of dyes which are insoluble or sparingly soluble in water, if it is desired to dye blended fabrics, for example polyester/cotton blends, with the granular formulations of this invention.

The dyes are used for example in the form of the aqueous filter cake, synthesis solution or suspension, of an aqueous oil or of a dry powder.

Depending on the water content of the dye, more or less additional water is required to prepare a spray slurry of low viscosity which can be readily pumped and sprayed. Accordingly, the requisite amount of water is added to the dye before drying and the corresponding amount of polyethylene glycol is dissolved in the resultant solution or suspension having a solids content of 100 to 700 g/l. It is, of course, also possible to dissolve or disperse the appropriate amount of dye in a ready prepared aqueous solution of the polyethylene glycol. The use of polyethylene glycol results in the formation of a low viscosity homogeneous spray slurry, the viscosity of which remains virtually constant even when changes in temperature occur, for example if the spray slurry is not processed immediately, as the polyethylene glycol effectively prevents the deposition or recrystallisation of the dissolved dye. The addition of polyethylene glycol, which is an essential feature of this invention, thus affords not only advantages with respect to the properties of the granular formulation obtained, but furthermore facilitates carrying out the process and thus ensures greater process reliability and reproducibility.

It is often necessary to add further assistants, for example an extender, to the spray slurry in order to adjust the dye to commercial strength. Such an extender shall have the property that it can be dried under the given conditions, and further that it may not interact with the dye. Particularly suitable extenders are sodium chloride, potassium sulfate, sodium sulfate, sugar derivatives such as dextrin; and also bone glue or ammonium chloride or ammonium sulfate, as well as anionic dispersants such as lignosulfonate or a naphthalenesulfonic acid/formaldehyde condensate.

In addition to the extender, further assistants conventionally contained in solid formulations may, of course, be added to the solution or suspension of the dye before drying. Such assistants are, for example, those that improve the water-solubility, solubility rate and the stability of the granules, for example nicotinamide or methacrylamide; or those for adjusting an optimum pH value, for example organic acids that are solid at room temperature, such as p-toluenesulfonic acid, maleic acid and monochloroacetic acid; or those that improve the the solid granular formulation, for example highly dispersed silicas, aluminium oxides or mixed oxides.

For spray drying or jet spray drying, the solution or suspension of the dye (spray slurry) is introduced into the spray tower by means of a device suitable for producing drops of the desired size (e.g. a pressure jet, a pneumatic jet or a rotating disc atomiser). The air inlet temperature of the drier is in the range from 110° to 200° C. and the air outlet temperature is in the range from 50° to 150° C. The atomised dry product desirably flows in the direction of the drying air (continuous current system).

The drying is carried out such that the temperature of the product does not exceed a specific critical limiting value above which the granular formulation undergoes irreversible changes. The flowable granulate so obtained has a high bulk density and can be easily removed from the drier and packed.

The fluidised bed drying can be carried out for example in an apparatus as described in DE-OS No. 2 231 445. Afterwards, the solution or suspension of the dye, to which assistants have been added, is sprayed continuously onto a fluidised bed of granulated dye. The resultant granular formulation is continuously removed from the fluidised bed with subsequent separation of large and fine particles which, optionally after comminution, are fed back to the fluidised bed.

The fluidised bed is produced by a stream of gas which preferably has an inlet temperature in the range from 70° to 300° C., while the temperature of the fluidised bed is preferably in the range from 50° to 200° C.

The fluidised bed pressure difference ($\Delta p$) is preferably from 0.5 to 1.5 kPa and the rate of flow is from 0.5 to 3 m/sec.

The fluidised bed temperature difference ($\Delta T$) is normally in the range from 5° to 15° C. The output can be suitably adapted, depending on the apparatus and product. It is advantageous to employ an apparatus with a sieve-plate measuring 2.5 $m^2$ and which is operated at a rate of 100 to 400 kg continuous yield of granulated product per hour. This output is achieved by the corresponding amounts of dye slurry fed into the drier.

Both drying methods yield a dust-free granular formulation having a granular size from 0.04 to 1.00 mm. The formulation has a tight granular size distribution, a high bulk density, and excellent mechanical strength. It is free flowing, does not form lumps, has good wettability and dissolves readily in warm water. No dust forms during transportation and storage.

Of the two drying methods, spray drying is preferred in the practice of this invention.

The granular dye formulations of this invention are particularly suitable for the preparation of aqueous dyebaths and printing pastes which, depending on the class of dye, can be used for dyeing and printing a very wide range of textile materials.

The invention is illustrated by the following Examples in which parts and percentages are by weight.

EXAMPLE 1

450 parts of polyethylene glycol having a molecular weight of 5000 to 6000 and a melting point of 55° C. are dissolved at room temperature in 1050 parts of water. To this solution are added 714 parts of the cationic dye of the formula

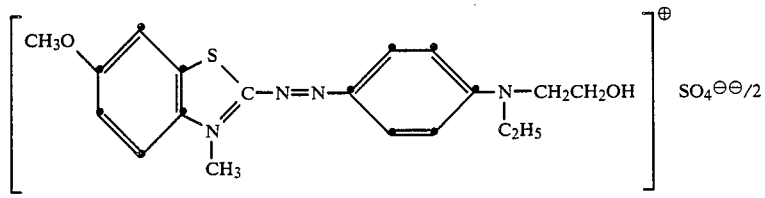

in the form of the filter cake (70% solids content).

The dye is suspended in the polyethylene glycol solution and the suspension (about 45% solids content; viscosity about 120 m Pa·s) is subsequently spray dried. Drying is carried out in a spray drier, fitted with a high-speed rotating disc, at an air inlet temperature of 140° C. and an air outlet temperature of 80° C. The dye slurry is sprayed under a pressure of 2 to 3 bar and the rate of flow is 180 to 220 parts per hour. Yield: 1000 parts of a granular dye formulation with a residual moisture content of 5%. The granules are virtually dust-free and are rated 4–5 in the following dust test. The granular formulation has a high bulk density, excellent abrasion resistance, and has a hot water solubility of 120 g/l. The formulation does not cause foaming during dyeing.

The dust properties are determined by the following test:

A metal funnel having an internal diameter of 10 cm and with a tail (internal diameter 15 mm) is placed on a 500 ccm metal cylinder. The bottom end of the tail extends to the 200 ccm level of the cylinder. A perforated round paper filter (Schleicher & Schuell LS14) is then secured at the 400 ccm level of the cylinder. The filter is moistened with water so that it is only moderately but not soaking wet. Then 10 g of the product to be tested is rapidly poured through the funnel. After 3 minutes, the funnel is taken out of the cylinder and the round paper filter is removed by cutting through it. The filter paper is then evaluated as follows in accordance with a scale from 1 to 5:

1 = pronounced dusting if the round paper filter is strongly to intensely coloured,
2 = substantial dusting if the round paper filter is faintly coloured,
3 = moderate dusting if there are present on the round paper filter many coloured specks, some of which are contiguous,
4 = slight dusting if there are coloured dots but no continuous coloured specks on the round paper filter,
5 = substantially dust-free if there is barely visible staining of the round paper filter and at most isolated dots are observed.

EXAMPLE 2

544 parts of polyethylene glycol having a molecular weight of 5000 to 6000 and a melting point of 55° C. are dissolved at room temperature in 1620 parts of water. To this solution are added 696 parts of the filter cake (60% solids content) of the acid dye of the formula

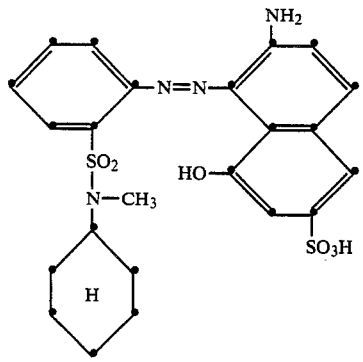

(in the form of the sodium salt). The dye is suspended in the polyethylene glycol solution and the suspension (about 35% solids content) is then spray dried. The spray drier is equipped either with an atomising disc or atomising nozzles. Drying is carried out at an air inlet temperature of 200° C. and an air outlet temperature of 100° C. The dye slurry is sprayed under a pressure of 2 to 4 bar. The rate of flow is 400 to 450 parts per hour.

Yield: 1000 parts of a granular dye formulation with a residual moisture content of 4%. The granules are dust-free and are rated 3 in the dust test (q.v. Example 1). The formulation dissolves readily in hot water (100 g/l) and does not cause foaming during dyeing.

A granular formulation which is also dust-free and dissolves rapidly in hot water is obtained by using the same amount of a higher molecular weight polyethylene glycol with a molecular weight in the range from about 10,000 to 20,000.

EXAMPLE 3

570 parts of polyethylene glycol having a molecular weight of 5000 to 6000 and a melting point of 55° C. are dissolved at room temperature in 1290 parts of water. To this solution are added 1000 parts of the filter cake (40% solids content) of the disperse dye of the formula

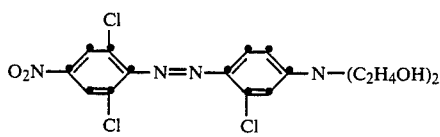

The dye is suspended in the polyethylene glycol solution and the suspension (about 35% solids content) is then spray dried. The spray drier is equipped either with an atomising disc or atomising nozzles. Drying is carried out at an air inlet temperature of 150° C. and an air outlet temperature of 76° C. The dye slurry is sprayed under a pressure of 2 to 4 bar. The rate of flow is 300 to 400 parts per hour.

Yield: 1000 parts of a granular dye formulation with a residual moisture content of 3%. The granules are dust-free and are rated 4 in the dust test (q.v. Example 1). The formulation dissolves readily in hot water and does not cause foaming during dyeing.

What is claimed is:

1. A process for the preparation of a granular dye formulation which comprises:
   a. suspending or dissolving a dye in water,
   b. adding to the product of step (a) a polyethylene glycol that melts in the range of from 40° C. to 150° C., and
   c. forming granules from the product of step (b) by spray or fluidized bed drying.
2. A process according to claim 1, wherein said polyethylene glycol has a molecular weight in the range from 1000 to 40,000.
3. A process according to claim 1 wherein the weight of said polyethylene glycol in the granular formulation is 50 to 200% by weight, based on said dye.
4. A process according to claim 1 wherein said dye is a water-soluble dye.
5. A process according to claim 1 wherein said dye is a cationic dye.
6. A process according to claim 1 wherein said granules are formed by spray drying.
7. A granular dye formulation prepared by the process of claim 1.
8. A process for dyeing or printing textile material with the product of claim 1.
9. A process acording to claim 2 wherein said polyethylene glycol has a molecular weight in the range from 5000 to 6000.

* * * * *